United States Patent
Campbell et al.

(10) Patent No.: US 9,501,790 B2
(45) Date of Patent: Nov. 22, 2016

(54) METHOD AND SYSTEM FOR SERVICE-ENABLEMENT GATEWAY AND ITS SERVICE PORTAL

(75) Inventors: Bruce S. Campbell, Plano, TX (US); Burton M. Strauss, III, Highland Village, TX (US); Myron C. Dolecki, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2122 days.

(21) Appl. No.: 12/504,163

(22) Filed: Jul. 16, 2009

(65) Prior Publication Data

US 2010/0011298 A1 Jan. 14, 2010

Related U.S. Application Data

(63) Continuation of application No. 11/102,360, filed on Apr. 8, 2005, now Pat. No. 7,574,660, which is a continuation of application No. 09/870,084, filed on May 30, 2001, now Pat. No. 6,920,615.

(60) Provisional application No. 60/250,037, filed on Nov. 29, 2000.

(51) Int. Cl.
| | | |
|---|---|---|
| G06F 3/14 | (2006.01) |
| G06Q 30/06 | (2012.01) |
| G06F 21/32 | (2013.01) |
| G06F 21/34 | (2013.01) |
| G06Q 20/36 | (2012.01) |
| G06Q 30/04 | (2012.01) |
| H04L 29/08 | (2006.01) |

(52) U.S. Cl.
CPC ............ *G06Q 30/06* (2013.01); *G06F 21/32* (2013.01); *G06F 21/34* (2013.01); *G06Q 20/3674* (2013.01); *G06Q 30/04* (2013.01); *H04L 69/32* (2013.01); *G06F 2221/2141* (2013.01)

(58) Field of Classification Search
CPC .................................. G06F 3/14; G06F 3/17
USPC ......... 715/200–277, 700–867; 700/701–866; 709/201–229; 705/14.66, 34, 50–79; 345/30–111; 348/206–231.9; 707/200–206; 710/8
See application file for complete search history.

(56) References Cited

U.S. PATENT DOCUMENTS

| | | | | |
|---|---|---|---|---|
| 5,655,148 A | * | 8/1997 | Richman et al. | .................. 710/8 |
| 5,852,722 A | * | 12/1998 | Hamilton | ...................... 709/221 |
| 6,304,857 B1 | * | 10/2001 | Heindel et al. | .................. 705/34 |
| 6,519,571 B1 | * | 2/2003 | Guheen et al. | ............ 705/14.66 |

* cited by examiner

*Primary Examiner* — Ruay Ho

(57) ABSTRACT

A method and system for dynamic service support is presented. A portal-page service and an interface bundle are installed at the gateway. A customer service at the gateway, based on the interface bundle, is installed at the gateway. The portal-page service searches for the customer service and generates a user interface for the customer service based on the customer service. The portal-page service generates a portal-page based on the user interface and the portal-page service.

18 Claims, 6 Drawing Sheets

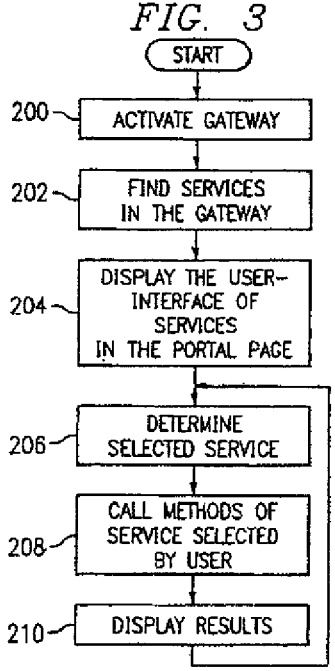
FIG. 3
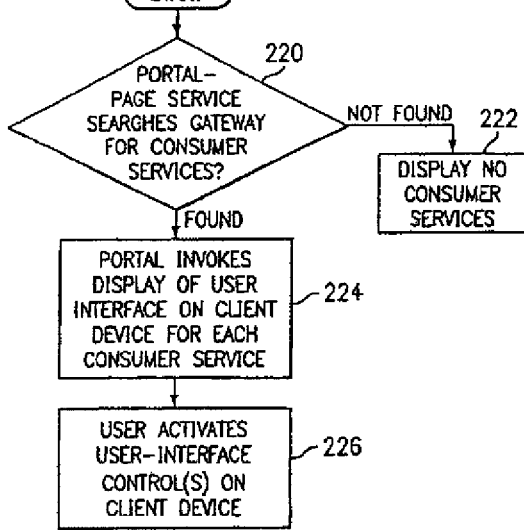
FIG. 3A
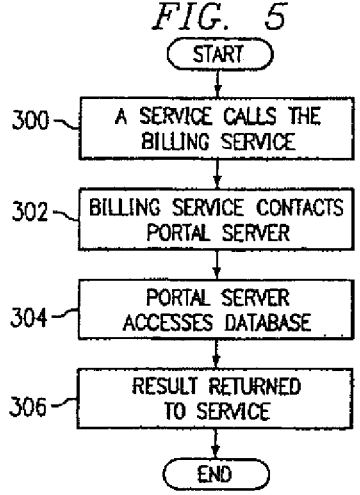
FIG. 5
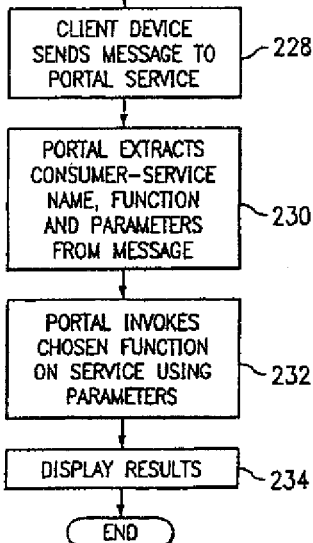

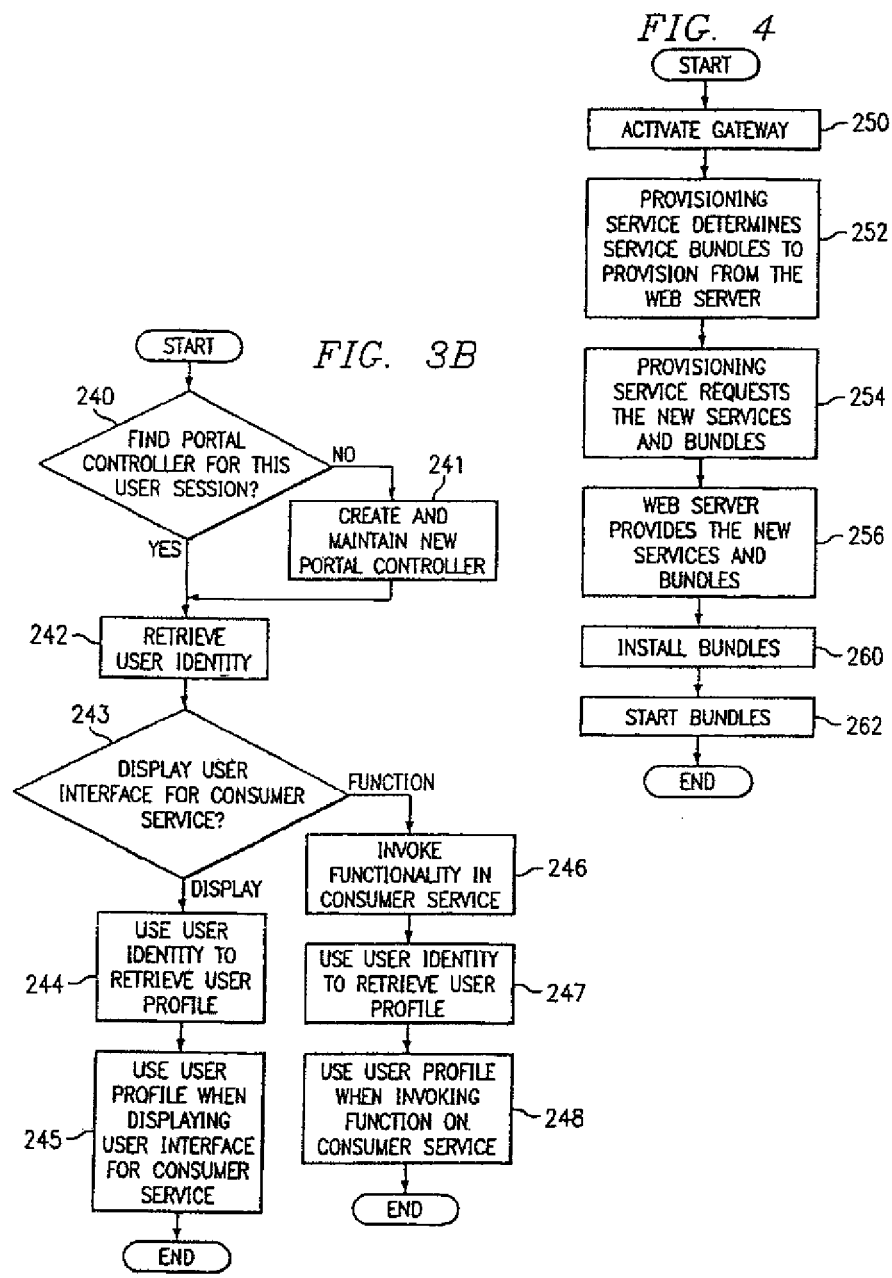

METHOD AND SYSTEM FOR SERVICE-ENABLEMENT GATEWAY AND ITS SERVICE PORTAL

RELATED APPLICATIONS

This is a continuation (CON) application of U.S. patent application Ser. No. 11/102,360, filed Apr. 8, 2005, entitled "Method and System for Service-Enabled Gateway and its Service Portal," which is a continuation (CON) of U.S. patent application Ser. No. 09/870,084, filed May 30, 2001, entitled "Method and System for Service-Enabled Gateway and its Service Portal," now U.S. Pat. No. 6,920,615, which claims benefit from U.S. Provisional Patent Application Ser. No. 60/250,037 filed Nov. 29, 2000, entitled "Software Architecture using OSGI Service, J2EE and an API to Deliver Data Services: A Case Study", and is related to U.S. patent application Ser. No. 09/870,143, filed May 30, 2001, entitled "Method and System for Partitioned Service-Enablement Gateway with Utility and Consumer Services," now U.S. Pat. No. 6,871,193.

TECHNICAL FIELD OF THE INVENTION

This invention relates in general to data processing, and, more particularly, to a method and system for a service enablement gateway with a service portal.

BACKGROUND OF THE INVENTION

As computers have grown increasingly important in today's society, the Internet has been increasingly used to deliver information and services to customer premises. Such services include purchasing merchandise, communication via email, voice and video, and downloading and uploading of data. Access to these services typically requires a computer accessing the Internet via a telephone-line connection.

Currently, automatically billing for services provided to a remote user is cumbersome and unreliable. Also, existing services provide minimal support for controlling specific devices present in a particular premises. For example, no control or customization of telephony features in the premises is possible.

SUMMARY OF THE INVENTION

Other embodiments, technical advantages, features, and aspects will be apparent to one of ordinary skill in the art from the following figures, descriptions, and claims.

A method and system for dynamic service support is presented. A portal-page service and an interface bundle are installed at the gateway. A customer service at the gateway, based on the interface bundle, is installed at the gateway. The portal-page service searches for the customer service and generates a user interface for the customer service based on the customer service. The portal-page service generates a portal-page based on the user interface and the portal page service.

The present invention provides numerous technical advantages. Various aspects of the present invention may have all, some or none of these advantages. One such technical advantage is the capability for a gateway to provide services without the use of a personal computer and with zero-administration by the user. Another such technical advantage is the provision and control of service user-interfaces with no prior knowledge of the service in a standard way according to the application programmer interface. Another such technical advantage is the ability for multiple users from a single location to access the gateway simultaneously. Another such technical advantage is the facilitation of revision and maintenance of the portal service over the network through its use of the model-view-controller design pattern.

One such technical advantage is the capability for delivery of services in a zero-administration, always-on gateway that use a remote server for all or a portion of their functionality and persistence, and an APT to dictate how they communicate with each other. Also a portal utility service provides and controls consumer service user-interfaces with substantially no prior knowledge of the consumer services in the gateway by using an API that dictates how the portal service finds services and displays their user-interfaces. The portal utility service also provides for access of multiple users from a location, and is designed to facilitate maintenance and revision.

BRIEF DESCRIPTION OF THE DRAWINGS

The present invention is best understood from the detailed description which follows, taken in conjunction with the accompanying drawings, in which:

FIG. 3 is a flow chart illustrating an exemplary method for interacting with a user interface to a user associated with the customer location according to the teachings of one embodiment of the present invention;

FIG. 3A is a flowchart illustrating further details of a method of operation of a portal service associated with the gateway according to one embodiment of the present invention;

FIG. 3B is a flow illustrating further details of the operation of the portal service according to one embodiment of the present invention;

FIG. 4 is a flow chart illustrating an exemplary method for automatically provisioning the services to the gateway according to the teachings one embodiment of the present invention;

FIG. 5 is a flow chart illustrating an exemplary method for accounting for use by the users for the use of the services and the bundles according to the teachings of one embodiment of the present invention;

FIG. 5 is a flow chart illustrating an exemplary method for providing customized gateways using a profile service according to the teachings of one embodiment of the present invention;

DETAILED-DESCRIPTION OF THE INVENTION

Figure 1:
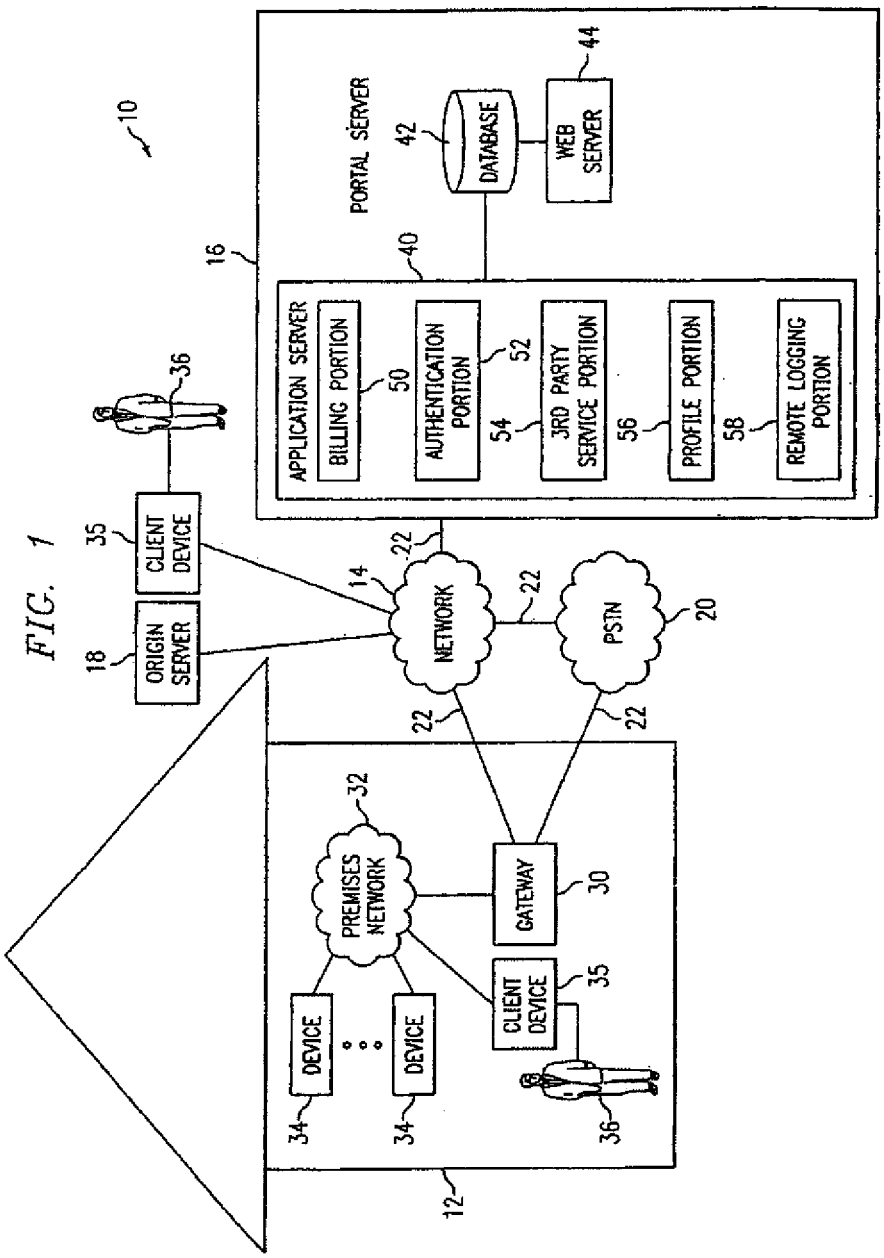
FIG. 1 is a block diagram illustrating an exemplary connected site system according to the teachings of one embodiment of the present invention.

High speed connections to the Internet are becoming more and more common in today's society. In addition, networks of computers are becoming increasingly important to both home and business users. The increasingly ease of use and commonality of high-speed Internet connections and computer networks is leading to a convergence between traditional electronic devices, such as appliances, environmental controls, lamps, and audio equipment, and computers.

A centralized connection and distribution point may be used to simplify management and control of devices and services available to a home or business and the Internet. An example is presented illustrating the use of a gateway to provide this centralized connection and distribution point in the context of a premises. The exemplary premises comprises a lamp and a computer, and a human user of both the lamp and the computer.

Traditionally, the user enters the premises and turns on the lamp. The user may then turn on the computer, connect to the Internet with an analog modem and then use the Internet.

At some point, the user may decide that the user needs faster access to the Internet and connect a relatively high-speed Internet connection to the computer. For example, the user may purchase a Digital Subscriber Line (DSL) modem or a cable modem.

The user may also decide that the user is tired of having to manually turn on the lamp every day. Thus, the user installs a home automation system which turns the lamp on automatically when the user arrives at the premises. For example, the user could wire the premises for a home automation system, use a home automation system which communicates over existing infrastructure, such as power lines, or use a wireless home automation system. The user decides that the user likes the home automation system and adds a thermostat to the home automation system. For example, a wireless communication protocol, such as the Bluetooth protocol, may be used to connect the thermostat to the home automation system. The user could also choose to use multiple home automation systems, such as a wireless system and a wireline system.

Now when the user enters the premises, the lamp turns on automatically and the thermostat automatically changes to the correct temperature. The user may then decide to do online stock trading so the user goes on the Internet and finds a stock trading program. The user then retrieves the stock trading program from the Internet, installs the program and signs up for stock trading services from an online trading service. For example, the user may access a subscription web page, enter information about the user and receive a user name and password from the online trading service.

The increased convenience and automation provided by the computer and the home automation system lack the ability to share information and use common control equipment. A gateway and a client device (such as a web pad) to control the gateway replaces or augments the computer and provides a means of controlling the home automation system using a network on the premises and/or the Internet. The gateway provides increased convenience and automation and supports control and use of the home automation system. New or upgraded software may also be automatically installed from the network on the gateway.

The user may use the gateway to access and control the home automation system in conjunction with and/or instead of using the control system supplied with the home automation system. The gateway may also provide a more familiar user interface to the user as opposed to the control system associated with the home automation system. In addition, the relatively high-speed internet connection may now be used with the home automation system to allow, for example, the user to access and control the home automation system from an external site, such as the office.

Now when the user is leaving work, the user can tell the home automation system to turn on the light at a particular time and tell the computer to begin downloading and printing various news items of interest to the user. While the user is coming home from work, the gateway may be informed that an online audio entertainment program is available. The gateway may then install the online audio entertainment program at the gateway provide an interface for using the program on the computer and wait for the user to approve signing up for the online audio entertainment's monthly subscription service.

When the user arrives at the premises, the lamp has been turned on and the user sits down at the computer. Waiting for the user at the web pad or other client device is the option for the user to approve or disapprove signing up for the online audio entertainment service. If the user approves signing up for the online audio entertainment, the gateway may retrieve appropriate personal information associated with the user and stored at the gateway and sign-up the user for service. The gateway may also support billing the user for the online audio entertainment. The gateway has allowed the user to sign-up for the online audio entertainment service by simply approving signing-up for the service. Thus, the user is freed from having to find an audio entertainment program and manually signing-up for service.

Similar to computers, the expandability of the gateway provides opportunities for a malicious person to introduce a virus or other detrimental software to the gateway. The ability of the gateway to control appliances, such as microwaves, TVs and thermostats, provides numerous possibilities for a malicious person or a virus.

FIG. 1 is a block diagram illustrating a connected premises system 10. System 10 comprises a customer location 12, a network 14, a portal server 16, an origin server 18, a public switched telephone network (PSTN) 20 and one or more communications links 22.

Customer location 12 houses a gateway 30, a premises network 32, one or more devices 34, one or more client devices 35 and one or more users 36. Client devices 35 and users 36 may also be located outside the customer's physical location 12 and access the gateway 30 via the network 14. Customer location 12 comprises a location associated with a subscriber to system 10. For example, customer location 12 may comprise a house, an apartment, a collection of multiple-dwelling units or a business.

Gateway 30 comprises hardware and/or software for managing communication between devices 34, origin server 18 and portal server 16. Gateway 30 is operable to communicate over premises network 32, network 14 and/or PSTN 20.

Premises network 32 comprises one or more networking technologies operable to communicate with one or more devices 34 and gateway 30. More specifically, premises network 32 may comprise suitable wireless and/or wireline network systems either alone or in suitable combination. Premises network 32 is described in more detail in association with FIG. 2.

Devices 34 comprise electronic and/or mechanical devices operable to communicate using premises network 32. For example, devices 34 may comprise phones, appliances, light switches, televisions, audio equipment, thermostats, and other devices operable to communicate using premises network 32. Devices 34 may use wireless and/or wireline technologies to communicate with premises network 32. Client devices 35 may comprise web-pads, personal digital assistants (PDAs), computers and other electronic devices capable of displaying a user interface and Hypertext Transport Protocol (HTTP) communication using premises network 32. Customer location 12 is described in more detail in association with FIG. 2. User 36 comprises a human user or an automated process operable to use client devices 35 and devices 34. For example, devices 34 and client devices 35 may communicate using a wireless networking protocol such as Bluetooth. Bluetooth comprises a relatively short range wireless networking protocol. Generally, Bluetooth attempts to connect devices which are about 30 feet from each other and provides about 1 mega-bit per second of bandwidth.

Network 14 comprises suitable data communications network operable to communicate data between gateway 30, portal server 16 and origin server 18. Network 14 may be further operable to communicate with PSTN 20. For example, network 14 may comprise an Ethernet network, an Asynchronous Transfer Mode (ATM) network, an Internet Protocol (IP) network, a cellular network, a Synchronous Optical Network (SONET), and other suitable networking technologies either alone or in combination. Network 14 may further comprise a suitable combination of wireless and wireline technologies. In the disclosed embodiment, network 14 may comprise, for example, the Internet.

Portal server 16 comprises an application server 40, a database 42, a web server 44. Application server 40 comprises software and/or hardware operable to support billing portion 50, authentication portion 52, profile portion 56, remote logging portion 58, and authorized third party portion 54. For example, portal server 16 may have a processor and computer readable memory for executing programs and other computer logic.

Logic, as used herein, comprises software and hardware instructions, input/output, components, data, and other suitable information operable to be used to achieve a result. Logic further comprises the instructions, input/output, components, data and other suitable information both during execution and while not being executed or otherwise used.

Storage, as used herein, comprises transient and/or persistent computer readable storage alone and in suitable combination. For example, storage may comprise transient storage such as dynamic random access memory (DRAM), static random access memory (SRAM), synchronous DRAM (SDRAM) and other suitable transient storage either alone or in suitable combination. Persistent storage may comprise magnetic media, such as a hard disk drive, optical media, such as a CD-ROM, and other suitable persistent storage either alone or in a suitable combination.

Billing portion 50 comprises software and/or hardware operable to support the billing of users 36 at customer location 12. Authentication portion 52 comprises software and/or hardware operable to authenticate users 36 at customer locations 12. Profile portion 56 comprises software and/or hardware operable to support premises preferences and user preferences at customer location 12. Remote-logging portion 58 comprises software and/or hardware operable to support logging of events in the gateway 30. Authorized third party service portions 54 provide network based functionality for authorized third party services. For example, portions 50, 52, 54; 56 and 58 may each provide support for their associated services using technologies such as remote distributed objects, remote procedure calls, access to Enterprise Java Beans (EJB), and other distributed functionality usable by gateway 30. As used herein, each means everyone of at least a subset of the identified items.

Database 42 provides data storage and retrieval capabilities directly and indirectly to portal server 16. More specifically, application server 40 may store and retrieve various types of information using database 42. In addition, portal server 16 may store and retrieve various types of information using database 42 directly over communication links 22.

Web server 44 comprises hardware and/or software for receiving and responding to requests for information from customer location 12 either alone or in suitable combination. Web server 44 may comprise a single computer executing software or may comprise a plurality of computers each executing software Web server 44 generally operates to return and/or generate one or more web pages, and to return software bundles containing utility services and consumer services. For example, web server 44 may comprise a hypertext transport protocol (HTTP) server. Web server 44 may additionally support other protocols such as the file transfer protocol (FTP). Web server 44 is operable to retrieve static and dynamic content such as prewritten text files, images, animations, applications, applets, dynamically generated web pages, pre-existing web pages and other data from data sources in response to requests for data.

Figure 2:
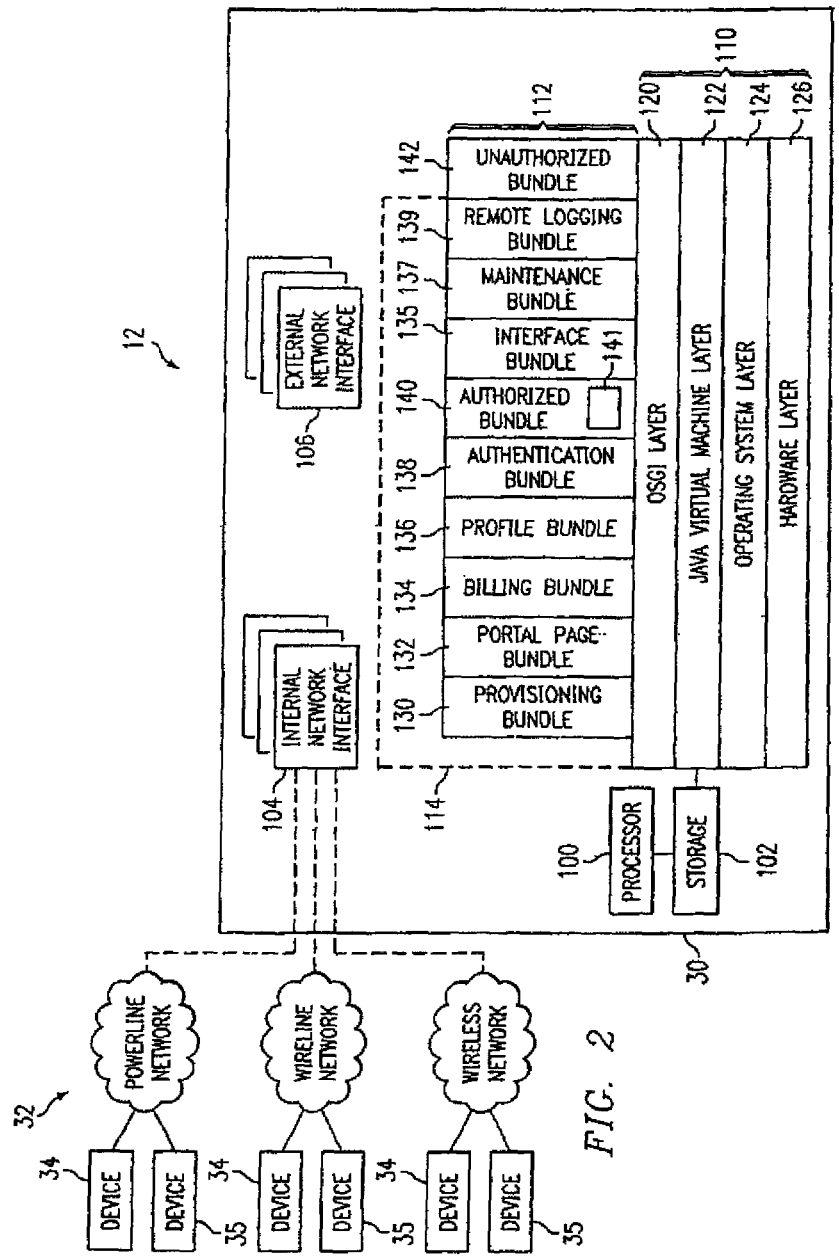
FIG. 2 is a block diagram illustrating details of a customer location and a gateway used in association with the connected site system according to the teachings of one embodiment of the present invention.

Web server 44 further comprises software and/or hardware operable to supply software bundles, described in more detail in association with FIG. 2, to gateway 30.

PSTN 20 comprises one or more public switched telephone networks either alone or in suitable combination. Communication links 22 comprise suitable data communications links between gateway 30, network 14, PSTN 20, origin server 18 and portal server 16. For example, communication links 22 may comprise a digital subscriber line (DSL), a cable modem, a T1 line, a dial-up line, an Ethernet connection, an ATM connection, a SONET connection, a fiber distributed data interchange (FDDI) connection, and other suitable data communications systems. Communication links 22 may also utilize wireless links, such as a cellular digital packet data (CDPD) network, a cellular network, a Bluetooth network, an Institute for Electrical and Electronics Engineers (IEEE) 802.11b network, a HomeRF Network, and other suitable wireless technologies either alone or in combination.

In operation, gateway 30 allows devices 34 and client devices 35 to access network 14 and PSTN 20. Gateway 30 also provides various services to devices 34 and client devices 35 and users 36. Gateway 30 may be provided with content by origin server 18 and access portal server 16 by devices 34 and client devices 35 and users 36. Gateway 30 may also retrieve data for updating, expanding and customizing gateway 30 from portal server 16. Also, gateway 30 may include security and partitioning capabilities. Devices 34 and 35 may access portal server 16 through gateway 30. Device 34 and 35 may also use gateway 30 to access the PSTN 20, such as when device 34 or 35 is a phone. For example, when a device 35 is a personal digital assistant (PDA), the PDA may retrieve information from portal server 16. Gateway 30 may then reformat the content retrieved from portal server 16 for proper display using the display on the PDA.

For example, a particular premises using gateway 30 may include many devices 34 and 35, such as a TV, lamps, a coffee maker, a thermostat and a computer, which communicate with a home automation system based on premises network 32. The premises may also include a relatively high-speed always-on Internet connection, such as a digital subscriber line (DSL) connection, coupled to the gateway 30. As used herein, "always-on" means capable of being available for an indefinite period of time and includes services which may be inactive from time-to-time. For example, while a DSL connection is capable of being continuously available, the DSL connection may be deactivated or unavailable for periods of time and still be termed an "always-on" service. Gateway 30 provides access to devices 34 and 35 and supports software for communicating with devices 34 and 35 and portal server 16. For example, software may be used by gateway 30 to allow communication between the Internet, the computer and the thermostat to allow user 36 to set the temperature at consumer location 12 from a remote location, such as the office. Gateway 30 may also support software for preventing security breaches and malicious software from impacting device 34, Client device 35 and user 36.

For another example, user 36 could use gateway 30 and a computer to place a time-sensitive stock purchase. More specifically, instead of placing a limit order on a stock, user 36 could specify a specific time for the transaction to occur and/or program various rules controlling when to purchase the stock using the computer and gateway 30.

In general, gateway 30 allows the many communications links that may be used to couple devices 34 and 35 and a relatively high-speed communications link to interact. The interaction between the Internet and the devices 34 and 35 allows the power and flexibility of the information available on the Internet and the functionality of the devices 34 and 35 to be used together to achieve increased usefulness to user 36.

FIG. 2 is a block diagram illustrating details of customer location 12 and gateway 30. Customer location 12 may have multiple devices 34 and 35 coupled to gateway 30 over one or more premises networks 32. For example, premises networks 32 may be a power-line network such as an X.10 network, a coax or twisted pair network such as an Ethernet network, a wireless network such as a Bluetooth network, or some other network. Premises network 32 may utilize multiple network types simultaneously.

Gateway 30 comprises a processor 100, memory 102, one or more internal network interfaces 104, one or more external network interfaces 106, one or more layers 110, and one or more bundles 112. Processor 100 comprises suitable general purpose or specialized electronic, optical or other processing device, such as a central processing unit (CPU), operable to communicate with storage 102 and to execute applications and logic encoded on storage 102. Processor 100 may comprise multiple processors.

Storage 102 comprises transient and/or persistent storage operable to store data either alone or in combination. For example, storage 102 may comprise a suitable combination of optical, electronic and/or magnetic storage, such as floppy disk drives, hard disk drives, CD-ROM drives, random access memory (RAM) and static RAM (SRAM). Storage 102 may also represent multiple computer readable storage devices in suitable combination.

Internal network interface 104 comprises one or more wireless and/or wireline communications interfaces either alone or in suitable combination. For example, internal network interface 104 may comprise an X.10 interface, an Ethernet interface, a Bluetooth interface, an ECHELON interface, a HomeRF Interface, and/or an IEEE 802.11b interface.

External network interface 106 comprises one or more wireless and/or wireline data communications interfaces either alone or in suitable combination. For example, external network interface 106 may comprise a digital subscriber line (DSL) interface, a cable interface, an analog modem interface, an Ethernet interface, an Asynchronous Transfer Mode (ATM) interface, a cellular digital packet data (CDPD) interface, a Bluetooth interface, and/or an IEEE 802.11B interface. External network interface 106 may comprise multiple types of interfaces in suitable combination. In the disclosed embodiment, external network interface 106 comprises a DSL interface.

Layers 110 comprise an OSGi layer 120, a Java virtual machine layer 122, an operating system layer 124, and a hardware layer 126. In general, a layer 110 comprises a discrete logical element based on one or more software and/or hardware elements either alone or in suitable combination. For example, a layer 110 may be based one or more collections of functions, such as a library of functions. For another example, a layer 110 may include hardware and appropriate software for interfacing with the hardware. Layers 110 may communicate with each other. In one embodiment, a given layer 110 may communicate only with layers 110 directly "above", and directly "below" the given layer 110. Layers 110 allow for functionality to be abstracted and/or organized in an appropriate fashion. For example, a "lower" level layer 110 may provide basic input/output capabilities by interfacing with hardware while a "higher" level layer 110 may use the "lower" level layer's functionality to support a word processing application.

OSGi layer 120 comprises the functionality provided by an OSGi system. More particularly, OSGi layer provides support for bundles 112 and the partitioning of bundles 112.

Java virtual machine layer 122 comprises a Java virtual machine operable to support execution of OSGi layer 120.

Operating system layer 124 comprises an operating system operable to support Java virtual machine layer 122 and OSGi layer 120 on the hardware used.

Bundles 112 comprise software modules, Application Programmer Interfaces (APIs) and other programs, either alone or in a suitable combination, usable by OSGi layer 120 to perform some function. For example, a particular bundle 112 may provide Internet stock trading capabilities. For another example, a particular bundle 112 may provide the ability to interface with devices 34 controlled by a home automation system. For yet another example, a particular bundle 112 may provide the ability to order groceries from an Internet-based grocery store. In general, bundles 112 comprise software that may be used at gateway 30 to provide functionality to user 36.

Bundles may be grouped into a partition 114. Bundles 112 may have an associated identity. For example, bundles 112 may be named. In one embodiment, the identity associated with a bundle 112 comprises an object oriented class name associated with the bundle 112.

Partition 114 comprises a grouping of one or more bundles 112 which operates to separate certain bundles 112 from other bundles 112. For example, a first bundle, which provides a sort functionality, in a partition is not accessible by a bundle outside of the partition. In one embodiment, a partition 114 may be formed by associating a particular digital identifier, such as a digital signature, with bundles 112 within a partition 114.

Partition 114 may be used to protect gateway 30 from malicious bundles 112. For example, a home automation interface bundle which is used to control the lights in a premises may be placed in a partition 114 and the partition 114 configured to forbid access to the home automation interface bundle by other bundles 112 without permission from user 36. By protecting the home automation interface bundle from unknown bundles, a decreased chance of a malicious bundle negatively impacting the comfort of the user, for example, cycling the lights in a house on-and-off at high-speed, is achieved.

In one embodiment, gateway 30 is based on OSGI OSGi typically allows bundles 112 to be installed in the OSGI system and supports communication between bundles 112. However, OSGI places minimal security and access controls on bundles 112. As computers have demonstrated, malicious programmers are both creative and plentiful. Partitions 114 provides gateway 30 with increased protection from malicious programmers by forbidding access to particular bundles.

A digital signature comprises a mathematically generated unique value which may be uniquely associated with an item. For example, cryptographic methods may be used to generate a unique value based on the characteristics of a particular bundle 112. For another example, a company may further identify a particular bundle 112 by applying further cryptographic transformations to the unique value associated with a particular bundle 112. In One Embodiment, Public Key/Private Key Encryption techniques may be applied to the unique value. The unique value associated with the bundle 112 may be encrypted using the private key associated with the company so that the public key associated with the company can be applied to the encrypted unique value to determine whether the company has actually authorized that particular bundle 112.

In operation, bundles 112 are installed in OSGI layer 120. The execution of bundles 112 by OSGi layer 120 is supported by Java virtual machine 122 in operating system 124.

Bundles 112 may provide various types of functionality to user 36, devices 34 and 35 and other bundles 112. In one embodiment, bundles 112 comprise a provisioning bundle 130, a portal page bundle 132, a billing bundle 134, a profile bundle 136, an authentication bundle 138, a maintenance bundle 137, a remote-logging bundle 139, an Application-Programmer-Interface bundle 135 and one or more authorized third party bundles 140. In one embodiment, the provisioning bundle 130, the portal-page bundle 132, the billing bundle 134, the profile bundle 136, the authentication bundle 138, the maintenance bundle 137, the remote-logging bundle 139 and the Application-Programmer-Interface bundle 135 are termed utility bundles. Bundles 112 may also comprise one or more unauthorized bundles 142.

Provisioning bundle 130 comprises a module operable to download data from portal server 16. More specifically, provisioning bundle 130 may retrieve utility bundles, authorized third party bundles 140 and updates to bundles 112 from portal server 16 using web server 44. In general, provisioning comprises retrieving bundles from a remote server to a local device and handling the retrieved bundle at the local device. For example, handling the retrieved data may comprise installing and starting the retrieved bundles at gateway 30. For another example, retrieving bundles from a remote server may comprise determining bundles available at the remote server which are not presently available at the local device and retrieving bundles at the remote server which are not presently available at the local device. Provisioning bundle 130 may receive notifications from and/or at regular intervals inquire of portal server 16 for updates or upgrades to bundles 112. Individual bundles 112 may provide for a self-update mechanism, or may be updated by provisioning bundle 130 at regular or irregular intervals or upon request from user 36.

Portal-page bundle 132 provides a user interface to user 36 at customer premises 12 to allow the user to interact with bundles 140. In addition, in one embodiment, authorized third party bundles 140 provide a user interface API for use by portal-page bundle.

Portal page bundle 132 may also provide the capability to reformat data depending on the type of client device 35 on which the data is to be displayed For example, when client device 35 is a Personal Digital Assistant (PDA) with a monochrome screen, portal page bundle 132 may remove graphics and convert colors for use on a monochrome display. In general, portal page bundle 132 may use knowledge regarding the size, type, speed, capabilities and other information associated with client devices 35 to reformat, change and otherwise modify data provided to client devices 35. For example, portal page bundle 132 may determine that a user is communicating with gateway 30 from a remote location using a PDA. Portal page bundle 132 may reformat a home page associated with the user for proper display on the PDA. For example, the reformatting may include removing and/or changing elements on the home page for display on the PDA.

Billing bundle 134 provides the capability for authorized third party bundles 140 to bill user 36 for services provided by those bundles 140. More specifically, billing bundle 134 may provide a particular billing service application programming interface (API) and associated support functionality for use by bundles 112. Billing bundle 134 may access billing portion 50 at application server 40.

Profile bundle 136 supports customization of gateway 30 by users 36 at customer location 12. More specifically, profile bundle 136 may track preferences associated with customer location 12, preferences associated with users 36 in the customer location 12, the location of the customer location 12, installed devices 34 at customer location 12, and other information. In addition, profile bundle 136 may communicate with portal server 16 so that portal server 16 can provide profile persistence to users 36 and location 12. In one embodiment, profile bundle 136 communicates with portal server 16 across network 22 by accessing Enterprise Java Beans based functionality in profile portion 56 at application server 40. Profile portion 56 then accesses database 42 where the preferences are stored in a persistent storage.

Authentication bundle 138 supports authorization and authentication of users 36. More specifically, authentication bundle 138 provides authentication functions by supporting the determination and verification of the identity of user. For example, authentication bundle 138 may use passwords, smart cards, magnetic stripe cards, fingerprints, retinal scans, and other suitable biometric, knowledge and/or item based authentication schemes either alone or in suitable combination. In addition, authentication bundle 138 provides authorization services to other bundles 112 within the partition 114 in gateway 30. More specifically, once it has been determined that user 36 is whom user 36 claims to be, the portal-page bundle 132 may need to determine whether user 36 is allowed to access a particular bundle 140. For example, authentication bundle 138 may consult an access control list (ACL) associated with a particular bundle 140 to determine whether a particular user 36 is allowed to access that bundle 112. In general, authentication bundle 138 may use a variety of suitable techniques for authenticating and authorizing users 36.

Application-Programmer-Interface bundle 135 comprises software modules that define functionality in utility services that consumer services 141 can access, software modules that define functionality that consumer services must have to interact with utility services, and software modules that provide interaction between consumer and utility services.

Authorized third party bundles 140 comprise other bundles 112 which are authorized to use particular services, such as provisioning bundle 130, portal page bundle 132, billing bundle 134, profile bundle 136, maintenance bundle 137, remote-logging bundle 139 and authentication bundle 138, in partition 114. For example, authorized third party bundles 140 may include functionality for controlling devices 36 when the devices are light switches, climate controls and other electronic and mechanical equipment. Authorized third party bundles contain authorized third party services which must implement specific API interfaces contained in the Application-Programmer-Interface bundle 135. Services which implement specific API interfaces and provide functionality to users 36 are called consumer services 141. Other third party bundles 142 comprise services which are not authorized to use bundles in partition 114. In general, utility services and consumer services communicate with each other. For example, a consumer service may send a request to one of the utility services and receive a response from the utility service.

Partition 114 provides controlled access to bundles 112. More specifically, unauthorized bundles 142 should be restricted from passing information to, receiving information from, providing services to, or requesting services from bundles 112 which are inside partition 114. The same restrictions may apply between authorized bundles inside partition 114 and unauthorized bundles 142. Referring to the example of FIG. 2, authorized bundles 140 may be allowed to access profile bundle 136 because authorized bundle 140 is within partition 114. In contrast, unauthorized bundle 142 may be forbidden from accessing profile bundle 136 because unauthorized bundle 142 is outside of partition 114.

Figure 2A:
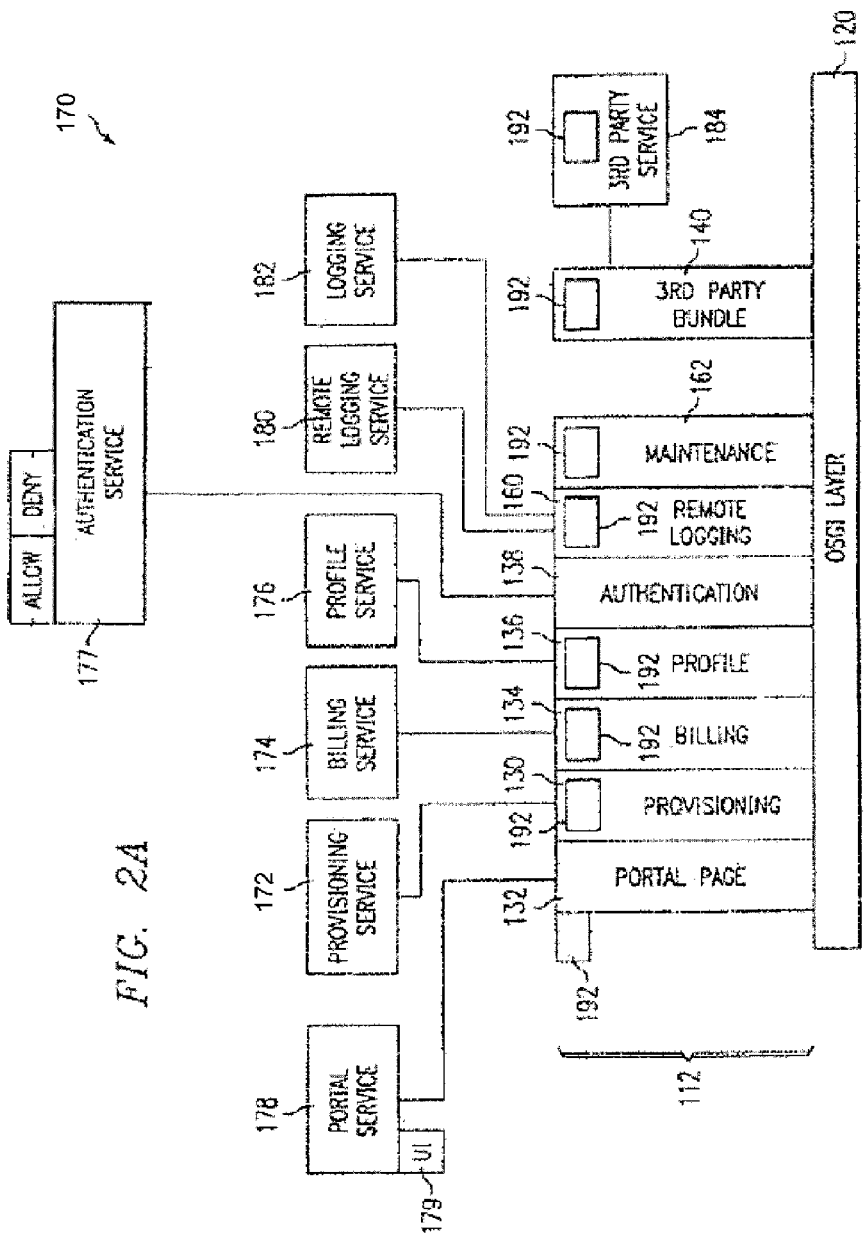
FIG. 2A is a block diagram illustrating one or more services provided by bundles associated with the gateway according to the teachings of one embodiment of the present invention.

FIG. 2A is a block diagram illustrating one or more services 170 provided by bundles 112.

Remote logging bundle 160 provides logging services to bundles 112. Bundle 160 stores and retrieves logged events, actions and other information from services 170 and bundles 112. Bundle 160 further provides support for remote access to portal server 16 for logging information.

Maintenance bundle 162 provides maintenance services and capabilities to gateway 30. For example, maintenance bundle 162 may periodically test the network environment, provide unique global sequence numbers and manage failed calls over the network. In one embodiment, maintenance bundle 162 may save one or more software objects encapsulating a method called by functionality of a service on storage 102 when a problem is detected or the method is prevented from completing. When, for example, communication with portal server 16 is restored, maintenance service 162 uses the saved software objects to resume and complete the originally called method. Also, upon request, maintenance bundle 162 may return network status information to other bundles 112, allowing other bundles 112 to properly handle loss of use of network 14. Returning to the stock trading program example previously described, the lack of an active network connection could cause the stock trading bundle to refuse to accept a trade request and instead suggest that the user place a telephone call directly to the brokerage house. In general, maintenance bundle 162 provides information regarding network status to bundles 112 and services so that the bundles and services may respond appropriately to the loss of the network.

Gateway 30 is further operable to provide one or more services 170. Services 170 are provided by particular bundles 112. More specifically, services 170 comprise functionality and capabilities that may be used by other services 170 to accomplish some task. A particular bundle 112 may provide one or more services 170. As shown in FIG. 2A, the portal-page bundle 132 contains a portal-page service 178, a provisioning bundle 130 containing the provisioning service 177. These utility bundles contain the utility services. Authorized bundles 140 contain authorized services 184 which are usually consumer services 141.

A bundle 112 may have an associated bundle digital identifier 192. Respective bundle digital identifiers 192 may be respectively associated with one or more bundles 112. Bundle digital identifier 192 comprises a unique pattern of data associated with a particular bundle 112 that may be used to authenticate the identity of the particular bundle 112. For example, digital identifiers 192 may be generated by applying a private key of a public key/private key encryption system to the associated bundle 112.

The digital identifiers 192 may be generated by applying key 179 to bundles 112. More specifically, key 179 may be used with a cryptographic algorithm to generate digital identifiers 192. For example, key 179 may comprise a private key associated with a public key/private key encryption system. For another example, key 179 may comprise an encryption key used with a symmetric encryption system, such as Blowfish or Twofish.

In one embodiment, gateway 30 may use the digital identifiers to support partition 114. For example, a partition 114 may be configured to grant access only to bundles 112 that have a particular associated digital identifier.

In the embodiment of FIG. 2A, gateway 30 provides the portal service 178, a provisioning service 172, a billing service 174, a profile service 176, an authentication service 177, a remote logging service 180, a maintenance service 182, which are utility services, and one or more authorized third party services 184 providing the consumer services.

Provisioning service 172 is associated with provisioning bundle 130. Provisioning service 172 may be invoked by the OSGI layer 120 at gateway startup. Provisioning service 172 operates to contact the portal server 16 to retrieve utility bundles and authorized third party bundles and updates from the web server 44.

Billing service 174 is provided by billing bundle 134. Billing service 174 may be called by other services 170 inside the partition 114. Billing service 174 communicates with billing portion 50 at portal server 16 in order to provide support for billing users 36. For example, user 36 may have signed up for various services provided by portal server 16 and billing service 174 may be used to generate an invoice to user 36 for the costs of those services.

Profile service 176 is provided by profile bundle 136. Profile service 176 may be called by other services 170 inside the partition 114. Profile service 176 operates to retrieve and store profile information, such as local customization for users 36 and the location 12, in database 42 at portal server 16 and locally in storage 102. For example, profile server 176 may be used to store a unique identifier associated with each user 36, the user's name and the address of customer location 12. In addition, profile service 176 may be used by other services 170 to store personalization and customization information for the other service 170. For example, profile service 176 may provide an API for use by other services 170.

Profile service 176 may contain preferences used to provide-customized presentations of information to users 36. More specifically, each user 36 at customer location 12 may have a customized portal page presenting various information. For example, a particular user may indicate various sports-related web sites that are of interest to that user that are to be displayed to that user when that user logs into a device 35. A user 36 may have one or more pre-set settings for devices 35. For example, when a user indicates that the user is in the living room, the volume for a home theater system controlled by gateway 30 may be automatically set. For another example, when a user may indicate particular TV programs which the user is interested in and specify that if the user is not logged in at home and at the TV, that gateway 30 should activate a VCR controllable by gateway 30 to record the TV programs. For yet another example, various users 36 in a given premises may have different preferred TV programs and profile service 176 may change a program list displayed on the TV based on the user currently logged-in at the TV. In addition, a parent may use profile service 176 to restrict the TV channels available to a child when the child is logged-in at the TV. In general, profile service 176 may store suitable settings for devices 34 and 35 for one or more users 36.

Authentication service 177 is provided by authentication bundle 138. Authentication service 177 may be called by other services 170 including portal-page service 178. Authentication service 177 operates to authenticate the identity of user 36, and to determine whether user 36 is authorized is access a Particular service 170 or bundle 140.

Portal-page service 178 is provided by portal page bundle 132. Portal service 178 operates to support selection and/or aggregation of user interfaces provided by other services 170.

The portal-page service 178 provides a user interface for consumer services 141 in gateway 30 which is automatically customized according to which consumer services 141 are present in OSGi layer 120, what device 35 is used to access the portal, and which user 36 is accessing the portal. In one embodiment, the user interface comprises a portal page 179. Portal page 179 is customized according to the services present because each consumer service in an authorized third party bundle 140 provides its own user interface (UI) to the portal in a manner specified by the Application-Programmer-Interface (APT) bundle 135. Consumer services in authorized third party bundles 140 implement specific API interfaces. More specifically, the API specifies the rules and interface associated with accessing functionality available from API bundle 135 and portal service 178.

Portal-page service 178 controls the functionality of the consumer services but remains independent of their code. Stated another way, the portal-page service can control any service which exposes its capabilities, information and interfaces, (collectively methods) in the manner specified by Application-Programmer-Interface (API) bundle 135 without having the consumer service's methods specifically already written into the code of the portal-page service. Thus the portal-page service is dynamic and able to display and control a changing collection of consumer services 141. In contrast, a typical user interface on a web page is coded to provide control for a fixed group of services and is static. The static approach is inappropriate for portal-page 179 because any changes to consumer services 141, such additions or deletions to the list of the consumer services in the portal-page, would require recoding and redistribution of portal-page service 178 to all of gateways 30.

The dynamic design of portal-page service 178 enables consumer services 141 written or provisioned after the deployment of portal-page service 178 to work in the gateway 30. Consumer services 141 can be added; deleted or changed without changing portal service 178, provided that consumer services continue to conform to the API provided by API bundle 135. The behavior of portal page service 178 allows gateways 30 to support a collection of consumer services 141 which may change with time and differ from gateway to gateway.

Portal page service 178 provides the dynamic behavior through indirect invocation of functionality by consumer services 141. When portal-page service 178 is written, the consumer services which will have their functions invoked are unknown, and are determined only when portal-page service 178 runs in gateway 30.

In one embodiment, portal-page service 178 invokes the methods in the consumer services using the dynamic capabilities of the Java programming language to display the user interface for a consumer service and use the functionality of a consumer service. In order to display the user interface, gateway 30 is searched for consumer services 141, using the definitions in the API provided by API bundle 135. The functionality mandated for consumer services 141 by the APT is indirectly invoked to display the user interface for each consumer service 141 installed in gateway 30. The invocation is indirect because when portal-page service 178 is installed in gateway 30, portal page service 178 has no prior knowledge of the specific consumer services 141 in gateway 30. For example, the indirect invocation may be achieved by using capabilities associated with the Java Reflection API, which allows portal-page service 178 to interact with consumer services when portal-page service 178 is running in ways that were unknown when portal-page service 178 was originally compiled.

Once the user interface for a consumer service or services is displayed in the portal-page generated by portal-page service 178, the functionality of a particular consumer service 141 may be activated by the user using portal-page service 178. A user activating a control in a user interface causes portal-page 179 to receive a message containing information about a specific function of a particular consumer service 141. The message is decoded in portal-page service 178 and information is extracted about what consumer service was activated, and what function and associated parameters of that service should be initiated in response. The proper function is invoked by portal-page service 178, without portal-page service 178 having prior knowledge of the specific consumer services in the gateway.

In addition, a user 36 may log in at a given client device 35, such as a computer or a PDA, and portal service 178 may present an appropriate web page based on the type and capabilities of device 34 or user device 35. The web page presented may also be customized based on information associated with the user and managed by profile service 176. For example, based on device 35, portal service 178 may recognize that user 36 is using a PDA. Portal service 178 may then present an interface appropriate for the small screens typically associated with PDAs. When user 36 logs into the computer located in the office, portal service 178 may present a different interface to user 36 because the user is now using a device 35 with increased capabilities compared to the PDA. For either the computer-based interface or the PDA-based interface, user 36 may also be able to control climate control systems, lighting and other appliances which communicate with gateway 30.

Remote logging service 180 is provided by remote logging bundle 160. Remote logging service 180 may be used by other services 170 to store a log of events, activities and other actions occurring at gateway 30 at a remote location using portal server 16 or another network based server. Logging service 182 is provided by remote logging bundle 160 and operates to store a local copy of events, actions and other activities occurring at gateway 30 in storage 102.

FIG. 3 is a flow chart illustrating a method for interacting with a user interface to user 36. The method begins at step 200, where gateway 30 is activated. Next, at step 202, gateway 30 searches for available services 170. More specifically, portal service 178 queries other bundles 112 at gateway 30 to determine what services 170 the other bundles 112 provide.

Then, at step 204, a user interface is displayed to user 36. More specifically, the services 170 may provide various user interfaces for use by users 36. Portal page service 178 is responsible for integrating and managing the user interfaces provided by services 170 to provide an integrated user interface for use by user 36. For example, authorized third party services provide an API for user interfaces that is used by the portal-page service 178 and bundle 132 to provide customer and user interfaces to user 36.

Proceeding to step 206, portal-page service 178 determines which authorized service 184 has been selected by user 36. Next, at step 208, portal-page service 178 invokes the appropriate method of the authorized service 184 requested by the user. The selected service 184 then performs the requested method and, at step 210, the results are displayed on an output device associated with user 36. For example, if user 36 has logged-in on a PDA, then the results are displayed in a format appropriate for the PDA. If user 36 has logged-in at a personal computer, the results would be displayed in a format appropriate for the personal computer. Often, the display capabilities of a PDA and a personal computer differ significantly. Portal-page service 178 may use the capabilities to reformat data based on the type of device 36 being used before displaying the data. The method then returns to step 206 to handle the selection of the next service 170 by user 36.

FIG. 3A is a flowchart illustrating further details of a method of operation of portal service 178. The method begins at decisional step 220, where portal-page service 178 determines whether any consumer services 141 are present in gateway 30. If no consumer services 141 are present in gateway 30, then the NOT FOUND branch of decisional step 220 leads to step 222. At step 222, no user interfaces for consumer services 141 are displayed on portal page 179. If consumer services 141 are present in gateway 30, then the FOUND branch of decisional step 220 leads to step 224.

At step 224, portal page 179 displays one or more user interfaces associated with found consumer services 141 on portal page 179. Portal page 179 formats the user interfaces based on client device 35 used to display portal page 179. Next, at step 226, user 36 actives-one or more controls associated with the user interface for a consumer service 141. Then, at step 228, client device 35 sends a data message to portal page service 178 indicating the controls active by user 36. Next, at step 230, portal page service 178 then extracts a service name, a function and one or more parameters from the data message from client device 35. Proceeding to step 232, portal page service 178 invokes selected function on the indicated service, such as one of the consumer services 141, with the indicated parameters. Then, at step 234, the results are displayed to user 36 on client device 35.

FIG. 3B is a flow illustrating further details of the operation of portal service 178 according to one embodiment of the present invention. Portal service 178 is further operable to maintain distinct state information for each user 36 accessing gateway 30. More specifically, as multiple users 36 may simultaneously be accessing gateway 30, portal service 178 maintains separate state information for each user 36.

The method begins at decisional step 240 where portal-page service 178 searches for a portal controller for a given user 36. For example, the portal controller for the given user 36 may be stored on storage 102. In one embodiment, the portal controller comprises a software object respectively instantiated for each user 36 that maintains the identity of user 36 and calls methods in consumer services for that user 36.

If portal-page service 178 does not find a portal controller for user 36, then the NO branch of decisional step 240 leads to step 241. At step 241, portal page service 178 generates a new portal controller for user 36, containing unique identity information for that user 36, and retrieves a user profile from profile service 176 for that user 36. If, portal-page service 178 does find a portal controller for user 36, then the YES branch of decisional step 240 leads to step 242.

Next, at step 242, an identity associated with user 36 is retrieved from the portal controller for that user 36. Next, at step 243, portal-page service 178 determines whether a user interface is to be displayed or if functionality has been invoked in a consumer service 141 using the user interface associated with that consumer service 141 at step 246. If a user interface is to be displayed, then the DISPLAY branch leads to step 244. The user identity is then used to retrieve the user profile from the profile service at step 244, and portal-page service 178 uses the user profile when displaying the user interface for the consumer service at step 245. The operation then ends.

If functionality has been invoked then the FUNCTION branch of decisional step 243 leads to step 246. At step 246 in the case of invocation of functionality in a consumer service, the portal controller uses the identity of the user to retrieve the user profile from profile service 176. Next, at step 247, the portal controller uses the user profile to invoke the functionality on the consumer service at step 248. The operation then ends.

FIG. 4 is a flow chart illustrating a method for automatically provisioning services to gateway 30. The method begins at step 250, where gateway 30 is activated. Next, at step 252, provisioning service 172 determines bundles 112, including utility bundles and authorized third party bundles to provision inside the partition to gateway 30 from portal server 16. More specifically, provisioning service 172 contacts the web server 44 over network 14. Then, at step 254, provisioning service 172 requests new bundles 112 based on the determination in step 252. Proceeding to step 256, web server 44 provides the requested bundles 112.

Proceeding to step 260, new bundles 112 are installed at gateway 30. More specifically, provisioning service 172 installs new bundles 112 at gateway 30. Then, at step 262, services 170 in bundles 112 are started and register with the OSGI layer 120.

FIG. 5 is a flow chart illustrating a method for accounting for use by users 36 for the use of services 170 and bundles 112. The method begins at step 300, where a service 170 calls the billing service 174. For example, an online trading service may need to bill user 36 for performing a stock trade. As a third-party company may have provided the online trading service, user 36 may not desire to reveal credit card or other information to the third-party company directly. Thus, the online trading service may be configured to use billing service 174 which user 36 trusts. Next, at step 302, billing service 174 contacts portal server 16. More specifically, billing service 174 contacts portal server 16 so that billing information is stored in database 42 and associated with user 36. For example, each user 36 may have a unique identifier associated with the user 36 so that the user 36 may be uniquely identified for billing and other purposes. In addition, each customer location 12 may have a unique identifier associated with the customer location 12, and users 36 may be identified uniquely within customer location 12. In general, a suitable technique may be used for identifying users 36 for billing purposes. Next, at step 304, billing portion 50 accesses database 42 to store billing information provided by billing service 174.

Figure 6:
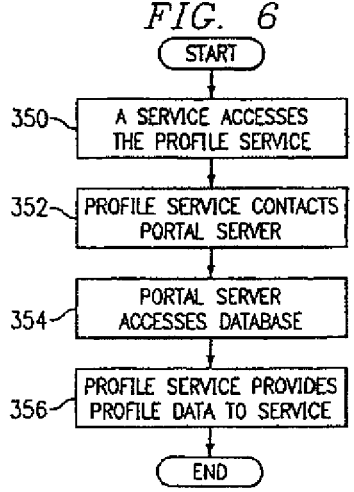

The method proceeds to step 306 where the result determined by billing portion 50 is returned to billing service 174. More specifically, billing portion 50 indicates to billing service 174 whether or not the billing information has been successfully saved in database 42 or has been rejected for some reason, such as the identification of an invalid user FIG. 6 is a flow chart illustrating a method for providing for customized gateways 30 using profile service 176. For example, a user may configure profile service 176 with the user's and premises preferences for temperature, lighting levels and TV programming choices. The method begins at step 350, where a service 170 accesses profile service 176. Next, at step 352, profile service 176 contacts portal server 16. Proceeding to step 354, portal server 16 accesses database 42 to store and/or retrieve user profile information and to retrieve premises profile information for profile service 176. More specifically, profile portion 56 stores profile information associated with users 36 so that a disruption in service at gateway 30 does not cause a loss in the personalized information. Next, at step 356, profile service 176 provides profile information to the service 170 which accessed profile service 176.

Figure 7:
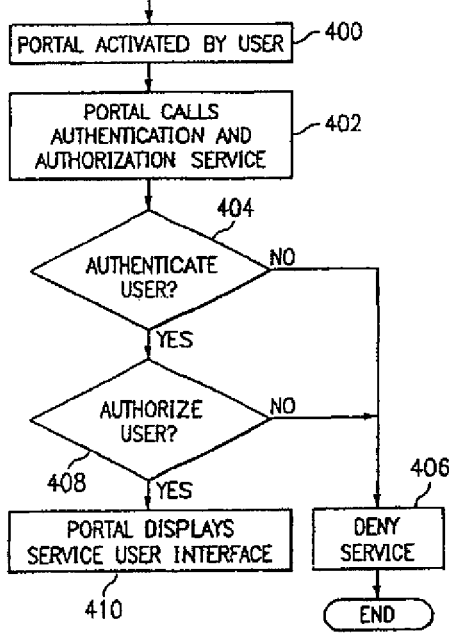
FIG. 7 is a flow chart illustrating an exemplary method for authenticating and authorizing the users who wish to use the gateway, the bundles and/or the services according to the teachings of one embodiment of the present invention.

FIG. 7 is a flow chart illustrating a method for authenticating and authorizing the users 36 who wishes to use gateway 30 or an associated bundle 112 or service 170. For example, a user may log-in to gateway 30 from a wireless PDA in the living room and gateway 30 then determines whether the user really is who the user claims to be and what the user is allowed to access at gateway 30. The method begins at step 400 where the portal service 178 is activated by user 36. Next, at step 402, the portal service 178 calls authentication service 177. Then, at decisional step 404, authentication service 177 authenticates the user's identity. More specifically, authentication 177 determines whether the user is really user 36. For example, authentication service 177 may require a password, a smart card, or other suitable identifying element. The identifying element may also be biometric, such as a fingerprint. If authentication service 177 determines that the user is not who the user claims to be, then the NO branch of decisional step 404 leads to step 406. At step 406, portal service 178 is denied to user 36 and portal service 178 aborts the requested operation. Returning to decisional step 404, if the user is authenticated as actually being user 36, then the YES branch of decisional step 404 leads to decisional step 408.

At decisional step 408, portal service 178 asks the authentication service 177 to determine whether authenticated user 36 is authorized to use a service 184. More specifically, authentication service 177 may determine whether user 36 is allowed to access the requested service 184. Authorization may be at a high level, where access is granted or denied to gateway 30, or at a low level, where access granted or denied for a specific service. For example, authentication service 177 may consult an access control list to determine whether user 36 is authorized to use the requested service 184. If authentication service 177 determines that user 36 does not have access to the requested service 184, then the NO branch of decisional step 408 leads to step 406. If authentication service 177 determines that user 36 is authorized to access the requested service 184, then the YES branch of decisional step 408 leads to step 410. At step 410, the requested service 184 is presented to the user 36.

Figure 8:
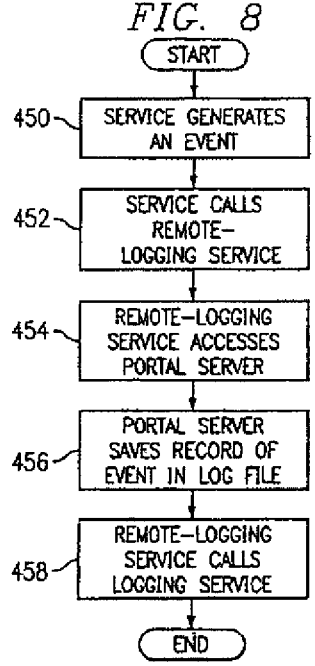
FIG. 8 is a flow chart illustrating an exemplary method for providing remote logging of events occurring at the gateway according to the teachings of one embodiment of the present invention.

FIG. 8 is a flow chart illustrating a method for providing remote logging of events occurring at gateway 30. The method begins at step 450 where a service 170 generates an event. Next, at step 452, a service 170 may call remote logging service 180. Then, at step 454, remote logging service 180 accesses portal server 16. More specifically, remote logging service 180 accesses remote-logging portion 58 at portal server 16. Proceeding to step 456, portal server 16 saves a record of the event generated at step 450 in a log file in database 42 associated with gateway 30. Then, at step 458, remote logging service 180 calls the OSGi logging service at gateway 30 to store a local copy of the event generated at step 450. The method then ends.

The connected site system of the present invention provides the capability to allow multiple different devices in a home or business location to access the Internet. The connected site system further provides the capability to control various electronic devices and reformat information based on the display, processing or other capabilities of the device. In addition, the system of the present invention allows for the customization of the gateway for use by users at the location. For example, the portal service may provide a web-based interface to a user so that the user can control climate control systems, appliances and other electronic devices at the location. The portal service may present an interface customized based on information associated with the user and the type of device on which the interface is being displayed.

The connected site system not only provides the capability to control devices within the premises, but to communicate with the Internet. The gateway may automatically retrieve and install new capabilities for use by the user. In addition, the gateway may upload information associated with the users to a remote portal server so that the customizations provided by the user are backed up in the case of failure of the gateway.

Other changes, substitutions, and alterations are also possible without departing from the spirit and scope of the present invention, as defined by the following claims.

What is claimed is:

1. A system, comprising:
   a gateway comprising a processor, a storage system, a first interface to a local premises network, and a second interface to a wide area network;
   a provisioning bundle, communicatively coupled to the gateway, configured to provide a provisioning service, wherein the provisioning service comprises receiving one or more bundles from a remote server over the wide area network and installing the received one or more bundles, and receiving updates to the one or more bundles and installing the received updates; and
   an authentication bundle, communicatively coupled to the gateway, configured to provide an authentication service, wherein the authentication service comprises authenticating an identity of a user and determining whether the user is authorized to access the one or more bundles.

2. The system of claim 1, wherein the one or more bundles include:

a profile bundle, communicatively coupled to the gateway, configured to provide a profile service, wherein the profile service comprises storing and receiving profile information corresponding to the user, the profile information comprises a unique identifier associated with at least one of the user, a user name, or a customization information for one or more of the services of the one or more bundles.

3. The system of claim 1, wherein the one or more bundles include:
a remote logging bundle, communicatively coupled to the gateway, configured to provide a remote logging service, wherein the remote logging service comprises receiving an event notification containing event data from one of the services of the one or more bundles, sending the event data to the remote server over the wide area network, and storing a local copy of the event data in the storage system.

4. The system of claim 1, wherein the one or more bundles include:
a maintenance bundle, communicatively coupled to the gateway, configured to provide a maintenance service, wherein the maintenance service comprises saving software objects encapsulating methods called by services of the one or more bundles in the storage system, and providing status information of the wide area network to the one or more bundles.

5. The system of claim 1, wherein the one or more bundles include:
a billing bundle, communicatively coupled to the gateway, configured to provide a billing service, wherein the billing service comprises receiving a billing request with billing information from one of the services, sending the billing information to the remote server, and receiving a response from the remote server indicating whether the billing information has been saved.

6. The system of claim 1, wherein the one or more bundles include:
a portal page bundle, communicatively coupled to the gateway, configured to provide a portal page service, wherein the portal page service comprises searching for the service of each of the one or more bundles, generating a user interface corresponding to one of the services, receiving a message containing information indicating a selected service function and associated parameters of the one of the services from the user interface, and initiating the selected service function using the associated parameters using the one of the services.

7. The system of claim 1, further comprising:
a partition, comprising at least one bundle of the one or more bundles, and configured to control access to the at least one bundle from outside of the partition.

8. The system of claim 7, wherein the at least one bundle comprises one or more digital identifiers that permit the at least one bundle to access the partition.

9. A method comprising:
communicating with a remote server over a wide area network to determine a number of bundles to install;
installing the number of bundles based on the communication;
placing at least one of the number of bundles within a partition when a digital identifier of each of the at least one of the number of bundles is an authorized digital identifier;
registering each service of each of the bundles of the partition;
receiving an identifying element of a user via a user interface; and
authenticating the user based on the identifying element.

10. The method of claim 9, further comprising:
receiving an event notification containing event data from one of the services of the bundles; and
storing a local copy of said event data in a storage system.

11. The method of claim 9, further comprising:
saving software objects encapsulating methods called by services of the bundles in a storage system; and
providing status information of the wide area network to the bundles.

12. The method of claim 9, further comprising:
receiving a billing request including billing information from one of the services; and
receiving an indication from the remote server as to whether the billing information has been saved.

13. The method of claim 9, further comprising:
searching for the service of each bundles;
generating a user interface corresponding to one of the services;
receiving a message containing information indicating a selected service function and associated parameters of the one of the services from the user interface; and
initiating the selected service function using the associated parameters using the one of the services.

14. A non-transitory computer readable medium comprising code to perform a method comprising:
contacting a remote server over a wide area network to determine a number of bundles to install, each bundle including a digital identifier and software to perform a service;
receiving the number of bundles from the remote server;
installing the number of bundles;
placing at least one of the number of bundles within a partition when the digital identifier of each of the at least one of the number of bundles is an authorized digital identifier;
registering each service of each of the number of bundles;
displaying a user interface;
receiving an identifying element of a user; and
authenticating the user based on the identifying element.

15. The computer readable medium of claim 14, the method further comprising:
receiving an event notification containing event data from one of the services of the number of bundles;
sending the event data to the remote server over the wide area network; and
storing a local copy of said event data in a storage system.

16. The computer readable medium of claim 14, the method further comprising:
saving software objects encapsulating methods called by services of the number of bundles in a storage system; and
providing status information of the wide area network to the number of bundles.

17. The computer readable medium of claim 14, the method further comprising:
receiving a billing request including billing information from one of the services; sending the billing information to the remote server; and
receiving a response from the remote server indicating whether the billing information has been saved.

18. The computer readable medium of claim 14, the method further comprising:

searching for the service of each of the number of bundles;

generating a user interface corresponding to one of the services;

receiving a message containing information indicating a selected service function and associated parameters of the one of the services from the user interface; and invoking the selected service function using the associated parameters using the one of the services.

* * * * *